Feb. 15, 1966 S. A. YEFSKY 3,235,152

TAPE DRIVE FOR MAGNETIC TAPE RECORDER

Filed Oct. 25, 1962

INVENTOR.
Sheldon Arthur Yefsky
BY
Ooms, McDougall and Hersh
Attys

United States Patent Office 3,235,152

Patented Feb. 15, 1966

3,235,152

TAPE DRIVE FOR MAGNETIC TAPE RECORDER

Sheldon Arthur Yefsky, Skokie, Ill., assignor to Cook Electric Company

Filed Oct. 25, 1962, Ser. No. 233,060
2 Claims. (Cl. 226—181)

This invention relates to magnetic tape machines adapted to make recordings on magnetic tape and to play back such recordings.

One object of the present invention is to provide a new and improved drive for advancing the tape in a magnetic tape machine.

A further object is to provide such a new and improved tape drive utilizing a capstan and a pressure idler roller for pressing the tape against the capstan, so constructed and arranged as to prevent any slippage of the tape relative to the capstan while also preventing speed variations due to the action of the idler roller on the capstan.

A further object is to provide such a new and improved tape drive in which the pressure exerted on the tape by the capstan and the idler roller is uniform across the width of the tape.

It is a further object to provide such a new and improved tape drive in which the idler roller is enabled to press the tape against the capstan with adequate force to prevent slippage, without imposing excessive frictional drag on the capstan.

Another object is to provide a new and improved tape drive of the foregoing character in which the idler roller is made of metal and is in the form of the outer race ring of a precision ball bearing.

Further objects and advantages of the present invention will appear from the following description, taken with the accompanying drawings, in which.

Figure 1:
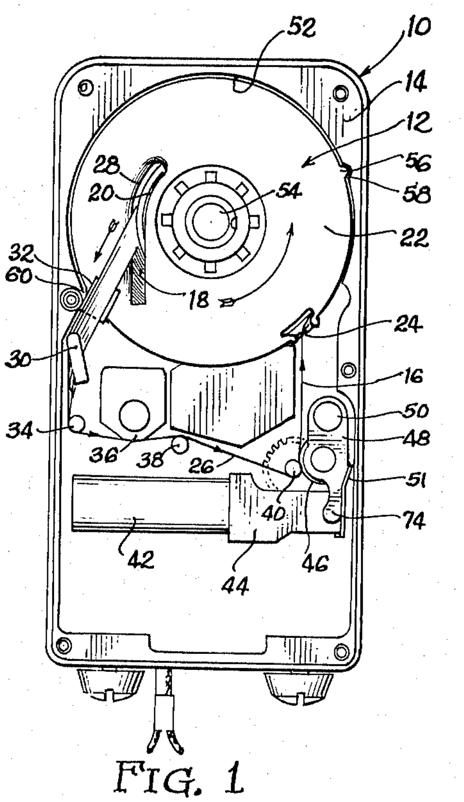
FIG. 1 is a plan view of a miniature magnetic tape machine having a tape drive to be described as an illustrative embodiment of the present invention.
Figure 3:
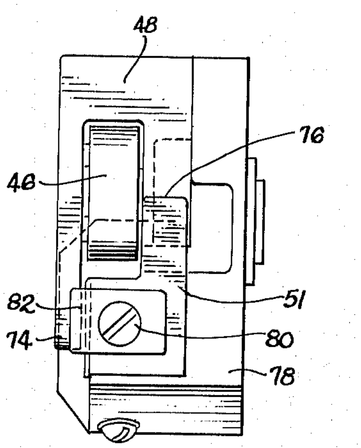
FIG. 3 is an elevational view taken generally as indicated by the line 3—3 in FIG. 2.

It will be seen that FIG. 1 illustrates a magnetic tape machine 10 which is of miniature size and thus is especially well adapted for use in aircraft, missiles, space vehicles, or the like. The tape machine 10 employs a removable tape cartridge 12 mounted on a chassis or deck 14. The tape cartridge may be of the construction disclosed and claimed in the applicant's application, Serial No. 370,149, filed May 19, 1964, and entitled Tape Cartridge, continuation-in-part of application Serial No. 231,972, now abandoned.

The tape cartridge 12 holds a considerable length of magnetic recording tape 16 wound in a coil or pack 18 contained within the cartridge. It will be understood that the magnetic tape machine 10 is adapted to make magnetic recordings on the tape and to play back such recordings. The ends of the tape may be spliced together to form an endless loop which may be utilized repeatedly by the tape machine. Thus, the tape is pulled out of the cartridge 12 from the inner end of the pack 18 through an exit slot or opening 20 in the casing 22 of the cartridge. Simultaneously, the tape is returned to the cartridge through an entrance slot or opening 24 in the casing 22. It will be seen that outside the casing 12 the tape 16 is formed into a loop 26 which extends between the exit and entrance openings 20 and 24.

In passing through the exit slot 20, the tape 16 is twisted through 90° so as to slide flatwise over a smoothly rounded edge or corner 28 on one side of the exit slot 20. To return the tape to a position parallel to the axis of the coil 18, the tape is passed around a guide 30 in the form of an angularly oriented bar or pin. A smoothly polished and rounded ramp 32 is provided on the top of the casing 22 to support the tape between the exit slot 20 and the angle bar 30. From the angle bar 30, the tape passes around a roller or other guide 34 to a combination recording and playback head 36, and then over another guide roller 38. Next, the tape passes around a drive capstan 40 and then proceeds directly to the entrance slot 24 in the casing 22. The capstan 40 may be rotated, either continuously or intermittently, by a motor 42 coupled to the capstan by a suitable gear box 44. It will be seen that the tape is pressed against the capstan 40 by an idler roller 46 which is rotatably mounted on a carriage 48 swingable about a pivot 50. A spring 51 is employed to bias the carriage 48 in such a direction that the idler roller 46 will firmly press the tape against the capstan 40.

In this case, the tape cartridge 12 is mounted in a well or opening 52 formed in the chassis 14. Optionally, a center pin 54 may also be provided on the chassis 14 to locate the cartridge. It will be seen that the casing 22 of the cartridge is formed with a key or ridge 56 which is received in a keyway or groove 58 formed in the chassis 14 at one point around the well 52. The engagement of the key and keyway prevents the cartridge casing 22 from rotating relative to the chassis 14. In addition, the casing 22 may be formed with a lug or abutment 60 which is engaged with a locating pin 62 on the chassis 14. Thus, the cartridge 12 is effectively located and prevented from moving or rotating on the chassis 14. Additional details of the tape cartridge may be obtained by referring to the previously mentioned copending application of the present applicant.

Figure 2:
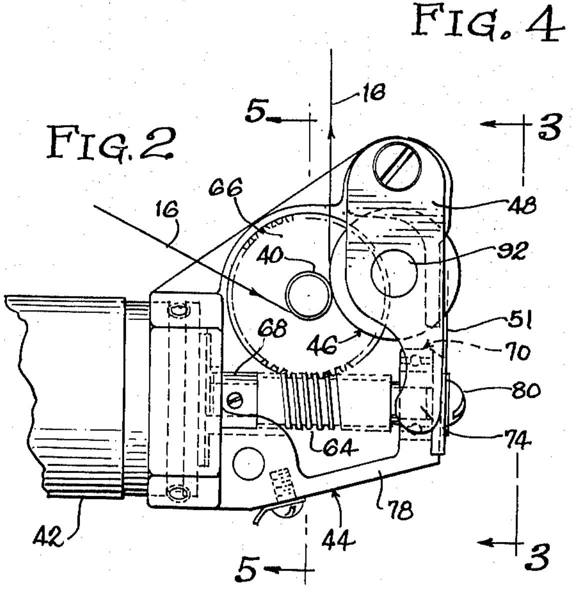
FIG. 2 is an enlarged plan view of the tape drive.

Further details of the gear box 44 and the carriage 48 for the idler roller 46 will be apparent from FIG. 2, which shows the gear box with its cover plate removed for clarity of illustration. In this case, the gear box 44 comprises a worm 64 which drives a worm wheel 66. The motor 42 has an output shaft 68 to which one end of the worm 64 is connected. The other end of the worm 64 may be supported by a precision antifriction bearing 70, preferably a ball bearing.

Figure 5:
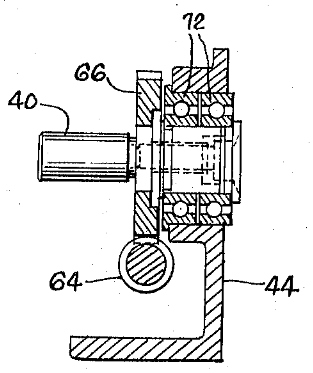
FIG. 5 is a sectional view taken generally along the line 5—5 in FIG. 2.

As shown to advantage in FIG. 5, the worm wheel 66 is secured directly to the capstan 40 which may be rotatably supported by a pair of precision ball bearings 72.

To facilitate the threading of the magnetic tape 16 between the capstan 40 and the idler roller 46, the carriage 48 is provided with an arm or handle 74 which projects beyond the idler roller and may be employed for manually swinging the carriage away from the capstan 40. It will be seen that the spring 51 is of the leaf type, having a flexible resilient finger 76 engaging the carriage 48. In this case, the spring 51 is clamped against a stationary supporting member 78 by means of a screw 80. A stop plate 82 is also clamped under the screw 80 and is arranged to project into the path of the handle or arm 74 so as to limit the movement of the carriage 48 away from the capstan 40. It will be understood that only a slight movement of the carriage 48 is necessary to provide for insertion of the magnetic tape between the capstan 40 and the idler roller 46.

Figure 4:
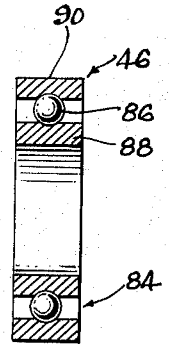
FIG. 4 is an enlarged sectional view taken through the idler roller shown in FIGS. 1–3.

In the usual or conventional tape recorder, the idler or pressure roller is made of soft resilient material, such as rubber or rubberlike synthetic material. However, the idler or pressure roller 46 of the present invention is made of metal or other equivalent hard unyielding material. As shown in FIG. 4, the idler roller 46 is in the form of the outer race ring of a precision ball bearing 84 which has a set of balls 86 retained between the outer race ring or roller 46 and an inner race ring 88. The outer race ring or roller 46 has a precision ground outer cylindrical surface 90 which directly engages the magnetic tape 16 and presses the tape against the capstan 40. Due to the high precision of the cylindrical surface 90, the pressure on the tape is uniform across its width. The inner race ring 88 is mounted on the carriage 48 by means of a precision shaft or pin 92.

In the operation of the tape machine 10, the motor 42 may be operated continuously or intermittently, to rotate the capstan 40 and thereby advance the tape 16. The precision metal idler roller 46 presses the tape firmly against the capstan 40. The pressure exerted by the roller 46 is derived from the spring 51, which biases the roller carriage toward the capstan 40. The tape 16 is pulled past the recording and playback head 36. It will be understood that the tape is pulled out of the cartridge 12 through the exit slot 20 and is pulled into the cartridge through the entrance opening 24.

By virtue of the provision of the pressure idler roller 46 in the form of the hard unyielding precisely cylindrical outer race of the ball bearing 84, any slippage between the tape 16 and the capstan 40 is positively prevented, even when the capstan 40 is driven at high speed and is stopped and started abruptly. The hard idler roller 46 is able to apply sufficient pressure against the relatively soft magnetic tape without imposing a frictional drag upon the capstan 40. Thus, the power required to operate the motor 42 is minimized. The power requirement of the motor is much less than it would be in the case of a rubber or other soft rubberlike pressure idler roller. In the case of a rubberlike roller, considerable power is required because of the continual working or compressing of the rubberlike roller when the roller is pressed against the capstan with the necessary biasing force. In the case of the hard unyielding roller of the present invention, no working or compression of the roller occurs, so that there is no loss on this account. Thus, a minimum biasing force is needed between the pressure roller and the capstan. Thus, the total load on the capstan bearings and the capstan shaft is minimized.

The utilization of the outer race ring of a ball bearing as the pressure idler roller has the important advantage that the outer ring is self-aligning with respect to the capstan, so that the pressure applied by the roller is uniform across the width of the tape.

The metal idler roller 46 remains precisely cylindrical and entirely flatless at all times, even after long service or long idleness. There is never any tendency for the roller to form flats or bumps. The formation of such flats or bumps is one of the problems encountered with idler rollers made of rubber or other soft resilient material. There is never any need to relieve the pressure between the metal idler roller 46 and the capstan 40 during periods of idleness, as there is in the case of rubber or other soft idler rollers. The pressure between the idler roller and the capstan may be maintained at all times, thus obviating any need for a mechanism to retract the idler roller from the capstan. Accordingly, the complexity, weight and size of the tape machine are reduced.

Due to the low frictional drag and precise cylindrical character of the idler roller, speed variations due to the action of the idler roller on the capstan are obviated so that the tape is driven with a high degree of uniformity and precision. It has been found that the hard precise idler roller makes it possible to drive the tape at greatly increased speed, yet with low power input to the drive motor and with no troubles due to fluctuations in speed.

It has been found that the pressure idler roller of the present invention overcomes the problem normally encountered with the driving of tape lubricated on one or both sides, as, for example, by the application of graphite to the tape. Such lubricated tape is highly advantageous for use with a tape cartridge.

With the hard pressure idler roller of the present invention, there is a definite and precise line of contact between the idler roller and the capstan. This factor allows precise stoppage of the tape and accurate indexing of the tape at the point of line contact with reference to an indexing line or mark on the tape. Thus, such indexing mark may be positioned at the point of line contact so that the tape will be started at a predetermined point when the capstan is rotated.

Various modifications, alternative constructions and equivalents may be employed without departing from the true spirit and scope of the invention, as exemplified in the foregoing description and defined in the following claims.

I claim:

1. A tape drive for a magnetic tape machine, the combination comprising a rotatable capstan for driving a magnetic tape, said capstan being made of a hard, incompressible, unyielding material and having a smooth and continuous cylindrical surface adapted to engage a first side of the magnetic tape, a movable support adapted to be actuated to permit threading of the tape around said capstan, means biasing said support toward said capstan, and a rotatable idler roller rotataby mounted on said support for driving the magnetic tape, said roller being made of a hard, incompressible, unyielding material and having a smooth and continuous cylindrical surface adapted to engage a second side of the magnetic tape, said cylindrical surfaces coacting together to provide for the tape a line contact that approximates an infinitely small contact area such that a highly efficient driving arrangement is produced, the hard, incompressible, unyielding material causing said cylindrical surfaces to maintain their cylindrical configurations irrespective of the time during which the capstan and rollers engage the magnetic tape.

2. In a magnetic tape machine, the combination comprising a rotatable capstan having a hard, incompressible, unyielding, metallic, smooth and continuous cylindrical surface adapted to engage a first side of the magnetic tape, a movable support adapted to be actuated to permit threading of the tape around said capstan, means biasing said support toward said capstan roller, an inner race ring mounted on said support, an outer race ring disposed around said inner race ring, and a set of balls confined between said inner and outer race rings and rotataby supporting said outer race ring, said outer race ring having a hard, incompressible, unyielding, metallic outer smooth and continuous cylindrical surface adapted to engage a second and opposite side of said magnetic tape, whereby said tape is pressed between and driven by said capstan and roller, said cylindrical surfaces coacting together to provide for the tape a line contact that approximates an infinitely small contact area such that a highly efficient driving arrangement is produced, the hard, incompressible, unyielding material causing said cylindrical surfaces to maintain their cylindrical configurations irrespective of the time during which the capstan and rollers engage the magnetic tape.

References Cited by the Examiner

UNITED STATES PATENTS

| | | | |
|---|---|---|---|
| 1,798,316 | 3/1931 | Dreisbach | 226—176 X |
| 2,538,893 | 1/1951 | Begun | 179—100.2 |
| 2,897,015 | 7/1959 | Knochenhauer | 179—100.2 X |
| 2,913,192 | 11/1959 | Mullin | 242—55.11 |
| 2,998,906 | 9/1961 | Vice et al. | 226—187 |
| 3,093,284 | 6/1963 | Mullin | 226—176 |
| 3,099,376 | 7/1963 | Kennedy | 226—190 X |
| 3,122,294 | 2/1964 | Laa | 226—189 X |

M. HENSON WOOD, Jr., *Primary Examiner.*

WILLIAM B. LABORDE, ROBERT B. REEVES, *Examiners.*